United States Patent [19]

Mees et al.

[11] 4,082,501
[45] Apr. 4, 1978

[54] MIXTURES OF OIL-SOLUBLE PHENYL- AND NAPHTHYL-AZO-PHENYL DYESTUFFS

[75] Inventors: Bernhard Mees, Konigstein, Taunus; Joachim Ribka, Offenbach am Main, both of Germany

[73] Assignee: Hoechst Aktiengesellschaft, Frankfurt am Main, Germany

[21] Appl. No.: 308,003

[22] Filed: Nov. 20, 1972

[30] Foreign Application Priority Data

Nov. 20, 1971 Germany .............................. 2157609

[51] Int. Cl.$^2$ .......................... C10L 1/10; D06P 1/00; D06P 3/00
[52] U.S. Cl. .............................................. 8/26; 44/59; 208/12; 260/196; 260/197; 260/205
[58] Field of Search ....................... 260/196, 197, 205; 8/25, 26; 208/12; 44/59

[56] References Cited

U.S. PATENT DOCUMENTS

| 211,671 | /1867 | Roussin et al. ....................... 260/197 |
| 1,590,728 | 6/1926 | Dorrer ................................. 260/205 |
| 2,087,282 | 7/1937 | Friedrich et al. ................ 260/205 X |
| 2,156,446 | 5/1939 | Bock ................................... 260/205 |
| 2,173,920 | 9/1939 | Siegel ................................. 260/197 |
| 2,174,501 | 9/1939 | Reich .................................. 260/195 |
| 2,224,574 | 12/1940 | Martone ............................... 260/197 |
| 2,224,904 | 12/1940 | Elley et al. ....................... 260/197 X |
| 2,237,772 | 4/1941 | Twitchett .............................. 260/197 |
| 3,049,533 | 8/1962 | Spitzer et al. ......................... 260/197 |
| 3,356,443 | 12/1967 | Dziomba .......................... 260/197 X |
| 3,476,500 | 11/1969 | Litke ........................................ 8/93 |

FOREIGN PATENT DOCUMENTS 1,490,125   6/1967   France ................................. 260/197

*Primary Examiner*—Floyd D. Higel
*Attorney, Agent, or Firm*—Curtis, Morris & Safford

[57] ABSTRACT

Mixtures of dyestuffs of the formula

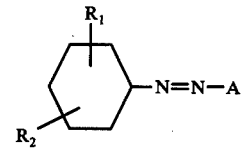

wherein $R_1$ and $R_2$ are hydrogen, lower alkyl or lower alkoxy and A is hydroxy phenyl or $\beta$-hydroxy naphthyl. These dyestuff mixtures are prepared in usual manner by diazotizing and coupling. They allow to prepare highly concentrated mother solutions in hydrocarbons which are useful for coloring hydrocarbons, oils, fuels.

8 Claims, No Drawings

MIXTURES OF OIL-SOLUBLE PHENYL- AND NAPHTHYL-AZO-PHENYL DYESTUFFS

The present invention relates to oil-soluble dyestuff mixtures and a process for their preparation.

To mark gasolines, Diesel oils, distillate fuel oils and others, oil-soluble dyestuffs are generally used in an amount of from 0.0001 to 0.001% by weight. The dyestuffs are usually dissolved in the hydrocarbons to be dyed in pulverized form. This form has, however, considerable drawbacks, as the pulverized dyestuffs mostly produce dust when they are weighed out or filled in. Difficulties also arise in the dissolving of the dyestuffs, for example, when the finely ground powder agglomerates partially or wholly by the action of moisture or heat as a consequence of its being stored without skill. Thorough stirring is also necessary in order to obtain an even dispersion of the dyestuffs.

By another method, the dyestuff powder is pressed via an air stream through a closed tube into the liquid to be dyed. This prevents the undesired dusting towards the outside, but in this case too the dyestuff must be free from clods. Dyeing with dyestuff powders has the further drawback that owing to the mode of preparation, a certain salt content cannot be avoided. This salt is conveyed with the dyeing into the oil tanks causing their rapid corrosion.

The drawbacks with the application of finely ground dyestuffs can be avoided by means of concentrated mother solutions furnished by the dyestuff producer. Concentrated solutions of oil-soluble dyestuffs in mineral oils or other hydrocarbons - for example, benzene or xylene - could not be prepared so far using the azo dyestuffs as usual, as their solubility is very lean in these solvents. The solubility of Solvent Orange I, for example (Colour Index No. 11920) in xylene is about 0.5 g/100 ml at room temperature. Solutions having a relatively low dyestuff concentration are, however, of no interest in practice because of the high proportion of solvent and the elevated package and transportation costs thereby caused.

The present invention provides mixtures of oil-soluble dyestuffs of the general formula

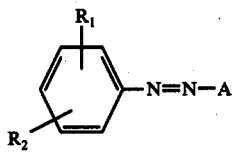

wherein $R_1$ and $R_2$, which may be identical or different, each represents a hydrogen atom, a lower alkyl or alkoxy group and A may be hydroxy phenyl and β-hydroxy naphthyl.

This invention also provides a process for preparing them which comprises coupling mixtures of diazotized aromatic amines of the general formula

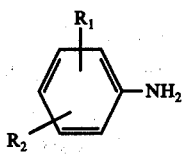

wherein $R_1$ and $R_2$, which may be identical or different, each is defined as above, with a mixture of phenol and β-naphthol.

Suitable substituents of the meaning given for $R_1$ and $R_2$ are, besides hydrogen atoms, alkyl and alkoxy groups having from 1 to 4 carbon atoms, preferably methyl and ethyl groups or methoxy and ethoxy groups. The use of the technically available xylidene or toluidene mixtures is of special advantage in practice. The mixtures of aromatic amines to be used in accordance with the invention consist of 2 to 10, preferably of 2 to 5, different amines. The molar ratio of the individual amines is not critical but it is advantageous to choose the mixing ratio in such a manner that the ratio of unsubstituted and m-substituted anilines to p- and o-substituted anilines is about 0.5 : 0.7 : 1. Thus, dyestuff mixtures are obtained the shade of which corresponds exactly to that of Solvent Orange 1 frequently used in practice. When lengthening the chain of the alkyl radical in o-position to the amino group from the ethyl to the propyl group, the solubility is increased but the shade is undesirably shifted towards red. By the same reason the portion of phenol should be from 20 to 40 mol percent and the β-naphthol from 80 to 60 mol percent when mixing the coupling components. When increasing the portion of phenol the shade is shifted towards yellow while the tinctorial strength and the solubility are decreased.

The dyestuffs of the invention are prepared in usual manner by mixing the amines used as diazo components in the ratio desired, diazotizing them in the aqueous medium and coupling them subsequently with the mixture of the coupling components. The dyestuff mixtures so obtained may then be isolated in the usual manner.

As the dyestuffs of the invention are often not present in crystallized but in smeary form due to their low softening point, coupling is advantageously carried out in the presence of organic solvents in which the dyestuff mixtures are dissolved. Suitable organic solvents for this purpose are aromatic hydrocarbons, for example, benzene, toluene or xylene. Mixtures of these hydrocarbons are preferably used, for example technical grade xylene mixtures in which the dyestuff mixtures are dissolved without leaving residues and do not precipitate as crystals at concentrations of from 50 to 60% by weight even at low temperature. The amount of solvent used may vary widely. The lowest amount is determined by the fact that the dyestuff mixture must be completely dissolved in the solvent. The upper amount is determined by the concentration of the dyestuff mixture desired in the solvent. The aromatic solvent may also be added after coupling has been completed. By this method, concentrated mother solutions for the dyeing of mineral oil products are obtained directly.

The dyestuff mixtures of the invention allow to prepare homogeneous dyestuff solutions in aromatic hydrocarbons which excel by their good stability on storage and their unlimited miscibility with mineral oils, and which have a dyestuff concentration of about 50% by weight. The shade of these solutions corresponds to the orange shade of the dyestuff Solvent Orange I determined by law for the dyeing of mineral oil products. The dyestuff mixtures are also suitable for dyeing lacquers, printing pastes, synthetic resins, plastics, textile fibrous materials and paper.

The following Examples illustrate the invention, the parts and percentages being by weight, unless stated otherwise.

EXAMPLE 1

In a solution of 275 parts by volume of water and 625 parts by volume of 5N hydrochloric acid, 15.4 parts of aniline, 20 parts of p-toluidine, 15.4 parts of m-toluidine, 25 parts of o-toluidine and 33.7 parts of o-ethylaniline were introduced at room temperature and stirred for one hour, whereupon the chlorine hydrates of the bases were formed. The mixture was cooled to 0° C and was diazotized depending on the consumption with 172.5 parts of 40% sodium nitrite solution. After having stirred again for 30 minutes in the presence of a slight nitrite excess, a slight amount of amidosulfonic acid was added just before coupling to destroy the nitrite excess. In a coupling vessel 300 parts by volume of water and 120 parts by volume of 33% sodium hydroxide solution were mixed. Then, 100.2 parts of β-naphthol and 28.2 parts of phenol were introduced in that mixture while stirring and the mixture was heated until it was dissolved. Then, it was cooled to about 5° C and the diazo solution was now added dropwise within 30 minutes. The pH of the mixture was adjusted to 9 to 9.5 with sodium hydroxide solution. The coupling was completed a few minutes after the addition. After isolation, a red dyestuff mixture was obtained which could be dissolved in gasolines, oils and aromatic hydrocarbons without leaving residues and which produced an orange shade.

EXAMPLE 2

In a coupling vessel, 100.2 parts of β-naphthol and 28.2 parts of phenol were dissolved in a mixture of 300 parts by volume of water and 120 parts by volume of 33% sodium hydroxide solution. The solution was cooled to 5° C and 295 parts by volume of a technical grade xylene mixture was added to it. Within 30 minutes, the diazo solution was added to that two-stage mixture in an analogous manner as described in Example 1, in which case stirring ought to be thorough. The pH was again adjusted at 9 to 9.5.

After coupling had been completed the suspension was heated to room temperature, the pH was adjusted at 6 to 7 with a little hydrochloric acid whereupon the two phases were separated. The aqueous phase was rejected. Subsequent washing of the organic phase was not necessary.

A stable, homogeneous solution of a dyestuff mixture was obtained which had a solids content of about 50% by weight.

When introducing 5 mg of that solution in 1 l of gasoline (140° C), an intense orange of high tinctorial strength was obtained.

EXAMPLE 3

To a solution of 300 parts by volume of water and 650 parts by volume of 5N hydrochloric acid, 14.6 parts of aniline, 24.2 parts of 2-amino-1,3-xylene, 29.6 parts of 4-amino-1,3-xylene, 24.2 parts of 2-amino-1,4-xylene and 24.2 parts of 5-amino-1,3-xylene were added at room temperature and the solution was stirred for 1 to 2 hours. It was then cooled to 0° C and diazotized with 131.1 parts by volume of a 40% sodium nitrite solution in the same manner as described in Example 1.

In a coupling vessel, 86.5 parts of β-naphthol and 37.5 parts of phenol were dissolved in a mixture of 350 parts by volume of water and 120 parts by volume of a 33% sodium hydroxide solution and the solution was then cooled at 0° to 5° C. To that solution, 258 parts of a technical grade xylene mixture was added. Coupling and further working up was carried out in an analogous manner as described in Example 2.

A stable homogeneous solution of a dyestuff mixture was obtained which had a similar shade as that of the mixture of Examples 1 and 2 in gasoline and in polymer lacquer but which had a somewhat higher tinctorial strength.

When introducing for example 2% by weight of this 50% dyestuff solution into a polymer lacquer and coating an aluminum sheet with this coloured lacquer by means of a hand coater, an orange of very high tinctorial strength was also obtained.

EXAMPLE 4

To a solution of 300 parts by volume of water and 650 parts by volume of 5N hydrochloric acid, 14.6 parts of aniline, 25 parts of o-toluidine, 24 parts of p-anisidine, 30.3 parts of o-phenetidine and 26.1 parts of o-ethylaniline were added at room temperature and stirred for 1 to 2 hours. The amines were diazotized in an analogous manner as described in Example 1.

The mixture of the coupling components was prepared as described in Example 3; coupling and further working up was carried out as it had been described in Example 2.

A stable, homogeneous solution of a dyestuff mixture was obtained. When adding 5 mg of that solution to 1 l of gasoline (140° C), an orange of high tinctorial strength was obtained the shade of which was somewhat more red than that of the dyestuff mixtures of Examples 2 and 3.

We claim:

1. A mixture of two to ten dyestuffs of the formula

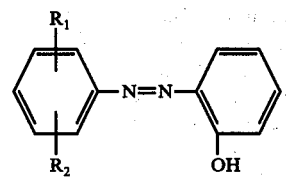

and two to ten dyestuffs of the formula

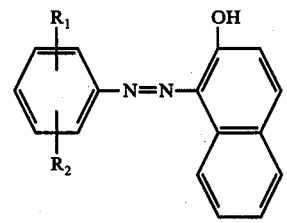

wherein $R_1$ and $R_2$ each is hydrogen, lower alkyl or lower alkoxy.

2. A mixture of dyestuffs according to claim 1 containing about 20 to about 40 mol percent of dyestuffs having the hydroxy-phenyl group and about 80 to about 60 mol percent of dyestuffs having the hydroxy-naphthyl group.

3. A mixture of dyestuffs according to claim 1 wherein $R_1$ and $R_2$ each is hydrogen, methyl, ethyl, methoxy or ethoxy.

4. A mixture of dyestuffs according to claim 1 containing dyestuffs wherein $R_1$ and $R_2$ each is hydrogen, wherein $R_1$ is 4-methyl and $R_2$ is hydrogen, wherein $R_1$ is 3-methyl and $R_2$ is hydrogen, wherein $R_1$ is 2-methyl and $R_2$ is hydrogen, and wherein $R_1$ is 2-ethyl and $R_2$ is hydrogen.

5. A mixture of dyestuffs according to claim 1 containing dyestuffs wherein $R_1$ and $R_2$ each is hydrogen, wherein $R_1$ and $R_2$ each is O-methyl, wherein $R_1$ is 2-methyl and $R_2$ is 4-methyl, wherein $R_1$ is 2-methyl and $R_2$ is 5-methyl, and wherein $R_1$ is 3-methyl and $R_2$ is 5-methyl.

6. A mixture of dyestuffs according to claim 1 containing dyestuffs wherein $R_1$ and $R_2$ each is hydrogen, wherein $R_1$ is 2-methyl and $R_2$ is hydrogen, wherein $R_1$ is 4-methoxy and $R_2$ is hydrogen, wherein $R_1$ is 2-ethoxy and $R_2$ is hydrogen, and wherein $R_1$ is 2-ethyl and $R_2$ is hydrogen.

7. A mixture of dyestuffs according to claim 1 containing two to five dyestuffs having the hydroxy-phenyl group and two to five dyestuffs having the hydroxy-naphthyl group.

8. A mixture of dyestuffs according to claim 1 in which the molar ratio of dyestuffs unsubstituted and substituted at the meta-position to dyestuffs substituted at the para-position to dyestuffs substituted at the ortho-position is about 0.5 to about 0.7 to about 1.0.

* * * * *